(12) United States Patent
Barber

(10) Patent No.: US 7,477,164 B1
(45) Date of Patent: Jan. 13, 2009

(54) VERTICAL PROFILE DISPLAY USING COLOR FILLED BANDS TO PROVIDE TERRAIN AWARENESS

(75) Inventor: Sarah Barber, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 369 days.

(21) Appl. No.: 11/006,920

(22) Filed: Dec. 8, 2004

(51) Int. Cl.
*G08B 21/00* (2006.01)
(52) U.S. Cl. .................. 340/945; 340/930; 340/948; 340/974; 340/977
(58) Field of Classification Search ............... 340/930, 340/945, 948, 960, 961, 963, 974, 977
See application file for complete search history.

(56) References Cited

U.S. PATENT DOCUMENTS

| | | | |
|---|---|---|---|
| 4,224,669 A | 9/1980 | Brame | |
| 5,079,711 A | 1/1992 | Lambregts | |
| 5,185,606 A * | 2/1993 | Verbaarschot et al. | 340/961 |
| 5,781,146 A * | 7/1998 | Frederick | 342/26 B |
| 5,936,552 A * | 8/1999 | Wichgers et al. | 340/963 |
| 6,043,756 A * | 3/2000 | Bateman et al. | 340/945 |
| 6,057,786 A | 5/2000 | Briffe | |
| 6,107,943 A | 8/2000 | Schroeder | |
| 6,154,151 A | 11/2000 | McElreath | |
| 6,362,776 B1 | 3/2002 | Hager | |
| 6,456,310 B1 * | 9/2002 | Wallace et al. | 347/116 |
| 6,505,102 B2 * | 1/2003 | Morizet et al. | 701/3 |
| 6,643,580 B1 | 11/2003 | Naimer | |
| 6,653,947 B2 * | 11/2003 | Dwyer et al. | 340/970 |
| 6,690,298 B1 | 2/2004 | Barber | |
| 6,691,004 B2 * | 2/2004 | Johnson et al. | 701/14 |
| 6,720,891 B2 | 4/2004 | Chen | |
| 6,995,690 B1 * | 2/2006 | Chen et al. | 340/974 |
| 2001/0036574 A1 * | 11/2001 | Fukuda et al. | 429/161 |
| 2002/0036574 A1 * | 3/2002 | Ishihara | 340/945 |
| 2003/0195672 A1 * | 10/2003 | He | 701/3 |
| 2005/0206533 A1 * | 9/2005 | Rogers et al. | 340/979 |

FOREIGN PATENT DOCUMENTS

WO  WO 01/20583  3/2001

OTHER PUBLICATIONS

U.S. Appl. No. 10/838,291, filed May 4, 2004, Paramore.

* cited by examiner

*Primary Examiner*—Jeffery Hofsass
*Assistant Examiner*—Edny Labbees
(74) *Attorney, Agent, or Firm*—Nathan O. Jensen

(57) ABSTRACT

The flight display includes a vertical terrain profile display having a format that includes a side-on vertical terrain profile comprising a plurality of color filled vertical alerting bands representing areas of terrain that are within defined limits above and below the airplane altitude. A symbol is positioned relative to the side-on vertical terrain profile for representing an altitude and position of the aircraft. Displays of range and altitude are positioned relative to the symbol and side-on vertical terrain profile in predetermined increments. In another broad aspect the side-on vertical terrain profile includes a plurality of color filled horizontal absolute altitude bands representing the absolute altitude of the terrain. These displays may be accompanied by nested color filled blocks representing weather hazards and/or terrain alerting prediction icons.

18 Claims, 11 Drawing Sheets

VERTICAL PROFILE DISPLAY USING COLOR FILLED BANDS TO PROVIDE TERRAIN AWARENESS

BACKGROUND OF THE INVENTION

1. Field of the Invention

The present invention relates generally to aircraft instrumentation displays and more particularly to the enhancement in the display of a vertical terrain profile (VTP) on an avionics flight display for providing a real-time, dynamic display of bands to denote terrain altitude so as to prevent controlled flight into terrain (CFIT).

2. Description of the Related Art

Controlled flight into terrain continues to plague air travel as one of the leading causes of fatal aircraft crashes. Improved methods of alerting a flight crew of potential CFIT conditions have been developed as a result of technology advancements. These technology enhancements include accurate aircraft present position information, terrain data and suitable storage means, and computer processing resources. One such improved alerting system is referred to as a Ground Collision Avoidance System (GCAS). The GCAS system utilizes aircraft present position information, aircraft state information, and a digital terrain database to determine a flight path of an aircraft relative to the surrounding terrain. Such a system is described in U.S. Pat. No. 4,224,669, entitled "Minimum Safe Altitude Monitoring, Indication and Warning System", issued to F. H. Brame.

Terrain awareness displays that use a format that provides a pilot or flight crew with complete situational awareness of potential terrain hazards to the aircraft are known. Positional information and terrain data in a database are used to display horizontal and vertical terrain information on a flight display. The information is formatted to provide an interface that provides the data conveniently, simply, and intuitively in a format that is easily assimilated and interpreted by a human operator. Such a terrain awareness display is disclosed in U.S. Pat. No. 5,936,552, entitled "Integrated Horizontal and Profile Terrain Display Format for Situational Awareness," issued to Wichgers et al, incorporated by reference herein in its entirety. Shown in this reference is a vertical terrain profile for a terrain path in a line directly in front of the aircraft out to a selected distance.

U.S. Pat. No. 6,690,298, entitled "Enhanced Vertical Terrain Profile Display," issued to Barber et al, discloses a VTP display that may be used to present terrain information in three colors. If the terrain is at or above the aircraft altitude in the side-on view or aircraft altitude in the end-on view, the side-on vertical terrain profile or the end-on vertical terrain profile will be depicted in red. If the terrain is within a predetermined distance such as 1000 feet below the aircraft, the side-on or end-on vertical terrain profile will be depicted in yellow. If the terrain is lower than 1000 feet below the aircraft, the terrain profiles will be depicted in brown. (Swathe lines on the compass or flight plan display will be displayed in the worst case color currently indicated on the VTP display. For example, if any red terrain is visible on the VTP display, the swathe lines will be in red.) As noted in that patent other colors may be used to make these display indications. U.S. Pat. No. 6,690,298 is incorporated by reference herein in its entirety.

U.S. Ser. No. 11/007,496, entitled, "Vertical Weather Profile Display Using Color Filled Blocks to Provide Weather Hazards", filed concurrently herewith, by the applicant, S. Barber, and assigned to the present assignee, discloses a vertical weather profile display having a format comprising a side-on vertical weather profile including a plurality of color filled blocks representing weather hazards. This co-filed patent application is incorporated by reference herein in its entirety.

U.S. Ser. No. 10/838,291, filed May 4, 2004, entitled, "Airborne Weather Radar System And Radar Display", by applicants S. Paramore, D. Woodell and S. Barber, assigned to the present assignee discloses an iconal representation of a vertical weather profile indicating level of hazard for an onboard weather radar system. U.S. Ser. No. 10/838,291 is incorporated by reference herein in its entirety.

As will be disclosed below, the present invention provides increased terrain awareness by providing additional vertical terrain representations to provide indications of absolute terrain altitude, terrain alerting, weather radar and terrain alerting prediction.

SUMMARY OF THE INVENTION

In a broad aspect, the present invention is a flight display for an avionics system of an aircraft for showing an enhanced vertical situation of an aircraft. The flight display comprises a vertical terrain profile display having a format that includes a side-on vertical terrain profile comprising a plurality of color filled vertical alerting bands representing areas of terrain that are within defined limits above and below the airplane altitude. A symbol is positioned relative to the side-on vertical terrain profile for representing an altitude and position of the aircraft. Displays of range and altitude are positioned relative to the symbol and side-on vertical terrain profile in predetermined increments. In a more narrow aspect, the color filled vertical alerting bands are overlaid on plain terrain. In another more narrow aspect, the filled vertical alerting bands are overlaid on color filled horizontal bands representing the absolute altitude of said terrain. In another more narrow aspect, the color filled vertical alerting bands are utilized in combination with nested color filled blocks, the nested color filled blocks represent weather hazards.

In another broad aspect, the side-on vertical terrain profile includes a plurality of color filled horizontal absolute altitude bands representing the absolute altitude of the terrain. In a more narrow aspect, the side-on vertical terrain profile further comprises color filled horizontal alerting bands representing areas of terrain that are within defined limits above and below the airplane altitude. The horizontal alerting bands are overlaid on the absolute altitude bands.

Various combinations of color filled vertical alerting bands, color filled horizontal absolute altitude bands, nested color filled blocks representing weather hazards, terrain alerting prediction icons, and indications of predicted flight path may be utilized as desired to enhance terrain awareness.

DETAILED DESCRIPTION OF THE INVENTION

Figure 1:
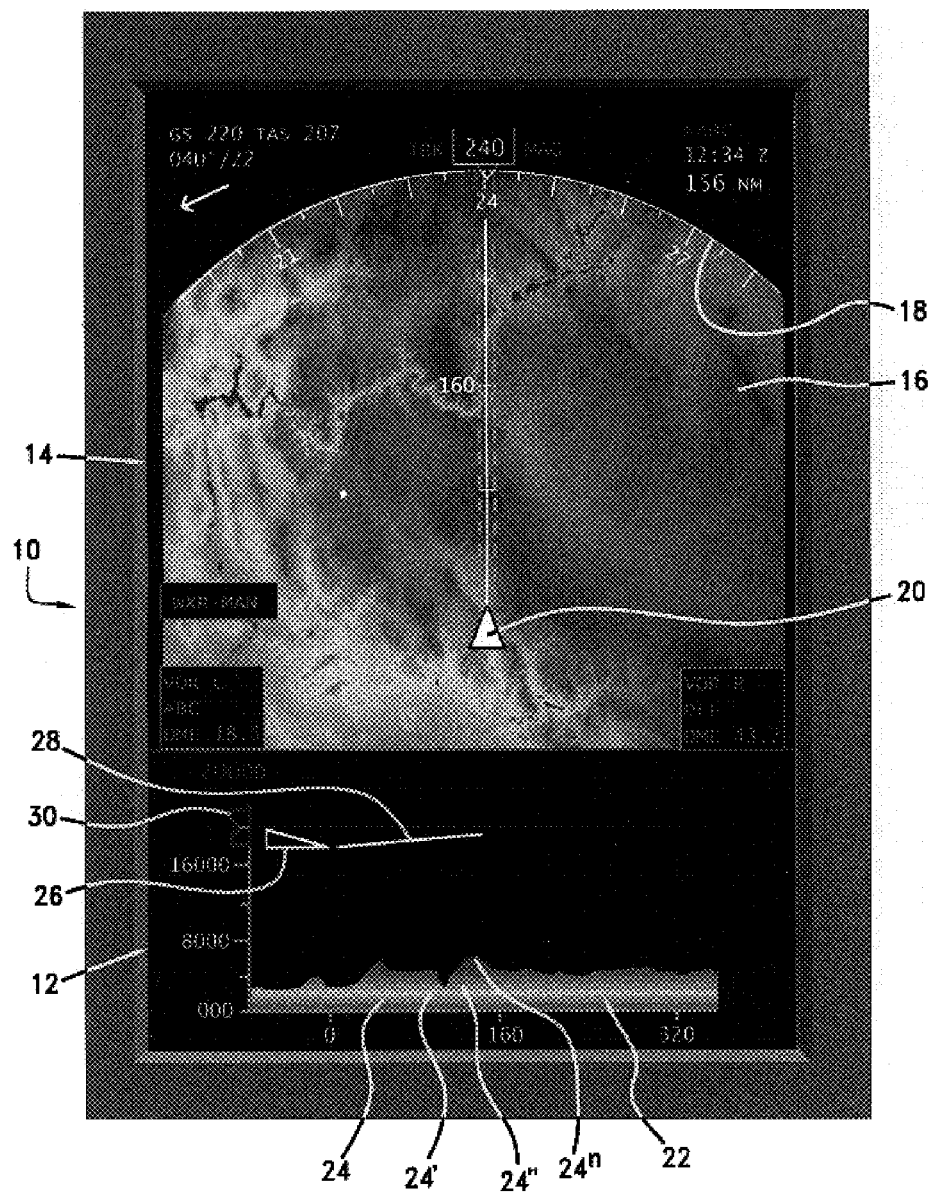
FIG. 1 shows a flight display of the present invention with a plan view display on the upper region and a vertical terrain profile display in the lower region with color filled horizontal absolute altitude bands representing the absolute altitude of the terrain, the colors in the vertical terrain profile display matching the colors used on the plan (horizontal) view display.

Referring now to the drawings and the characters of reference marked thereon, FIG. 1 illustrates a first preferred embodiment of the flight display of the present invention, designated generally as 10. In this embodiment the flight display includes a lower region having a vertical terrain profile display 12 and an upper region having a plan view display 14. The plan view display includes a plan view 16 of the terrain, a compass rose or arc 18, a horizontal display aircraft symbol 20, and various data fields. This plan view display aspect of the flight display 10 is known in this field and incorporated with avionics systems manufactured by the assignee of the present invention, Rockwell Collins, Inc.

In FIG. 1, the vertical terrain profile display 12 has a format that includes a side-on vertical terrain profile, designated generally as 22. The side-on vertical terrain profile 22 includes a plurality of color filled horizontal absolute altitude bands, e.g. 24, 24', 24" . . . 24''', representing the absolute altitude of the terrain. As can be seen in this figure there are more horizontal bands than designated by the numeral designations above. The colors in the vicinity of band 24 and below it are varying shades of green—from a dark green on the bottom bands to a light green band 24. Band 24' is yellow with bands in it's vicinity of varying degrees of yellow. The bands darken to brown and reach a dark brown color at 24'''. The use of the colors noted above is by way of illustration and not limitation. However, the colors used for showing absolute altitude should be different than those used by alerting bands (discussed below). As used herein the term "absolute altitude" generally refers to the altitude of any point along the terrain profile relative to sea level. However, other reference standards may be used (for example, GPS altitude).

An aircraft symbol 26 represents the altitude and position of the aircraft in accordance with its position relative to the side-on vertical terrain profile. The aircraft symbol preferably includes a lead line 28 denoting the airplane flight path.

Display of range and altitude are positioned relative to the aircraft symbol 26 in predetermined increments, for example, increments of 160 nm, as shown in this figure. The y-axis represents altitude and includes altitude indicators, for example, in increments of 8000 ft.

The vertical terrain profile display 12 also preferably includes symbology 30 that indicates a pre-selected altitude for the flight control system.

Figure 2:
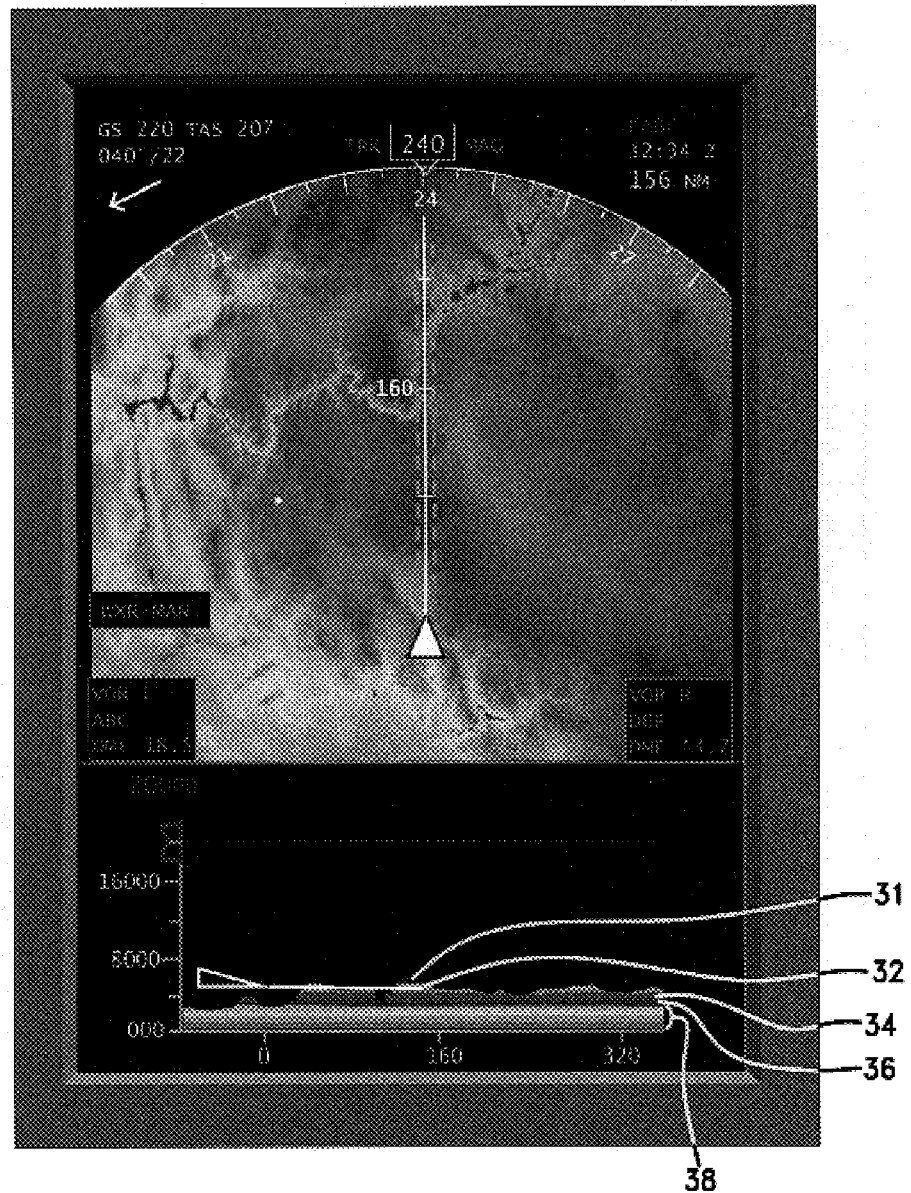
FIG. 2 shows a flight display with the vertical terrain profile display in the lower region presenting color filled horizontal alerting bands in combination with horizontal absolute altitude bands.

Referring now to FIG. 2, an example is illustrated in which color filled horizontal alerting bands are utilized for terrain alerting. A red alerting band 31 and yellow alerting band 32 are used to represent terrain above the aircraft. Green alerting band 34 and dark green alerting band 36 indicate terrain below the airplane. The alerting bands are shown overlaid on color filled horizontal absolute altitude bands, collectively referred to as 38. The color filled horizontal alerting bands in this figure are colors utilized by Enhanced Ground Proximity Warning System/Terrain Awareness and Warning Systems (EGPWS/TAWS). They preferably contain varying patterns of saturated green, yellow and red. The color filled horizontal absolute altitude bands 38 preferably contain varying shades of green through brown that may emulate those colors used in sectional aeronautical charts.

The color filled horizontal alerting bands are preferably calculated based on the highest terrain within a horizontal swath, along the airplane track or flight plan. The swath is typically nominally set to the Required Navigation Performance (RNP). The Flight Management System (FMS) typically provides the RNP value that sets the swath width.

Figure 3:
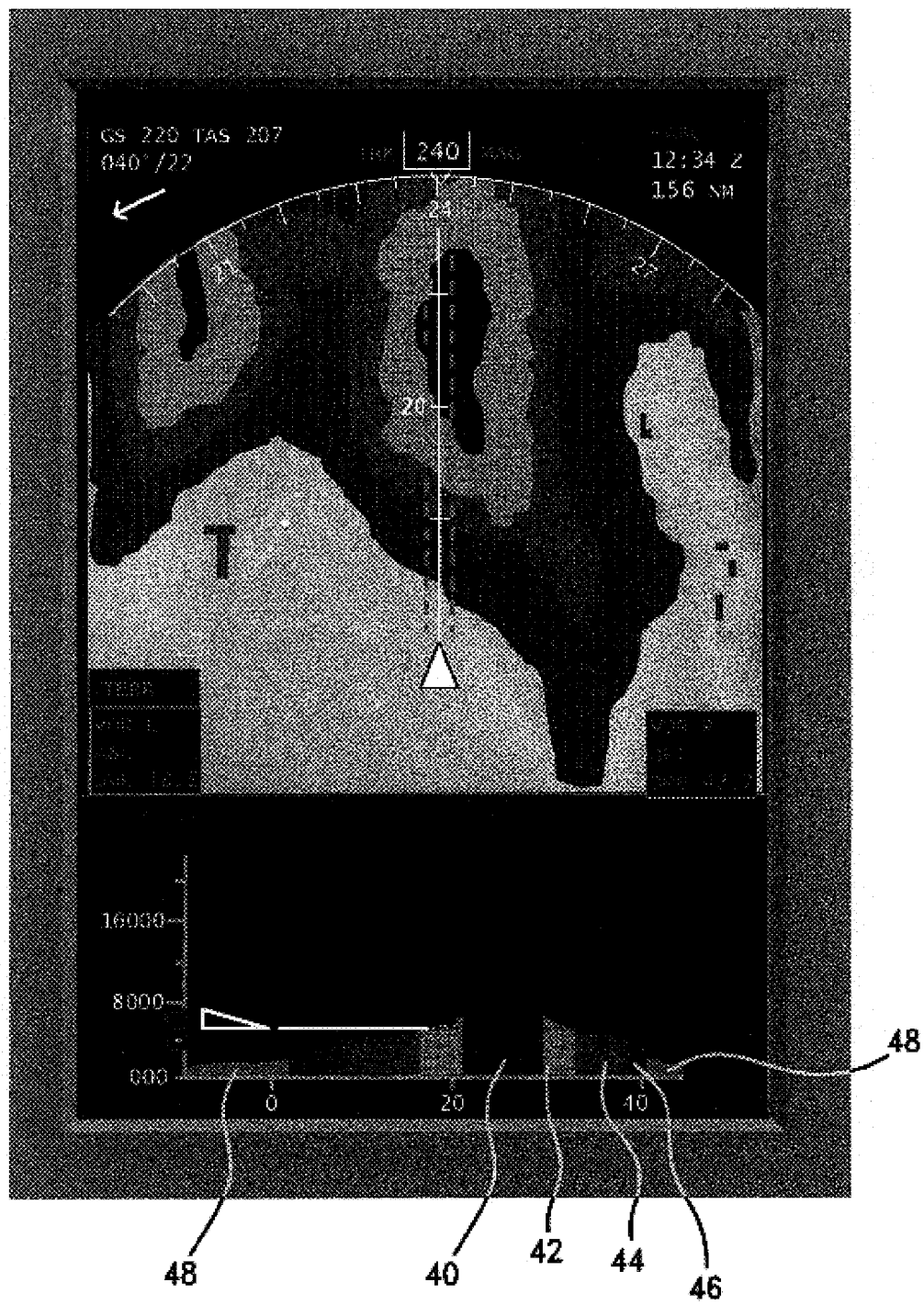
FIG. 3 shows a flight display presenting color filled vertical alerting bands over plain brown terrain.

Referring now to FIG. 3, another approach is shown. In this instance, color filled vertical alerting bands 40, 42, 44, 46, 48 are utilized over plain brown terrain 48. This approach fills the area underneath the different alerting layers with the "worst-case" color. This approach may provide an optimum level of discrimination between background terrain and alerting terrain.

Figure 4:
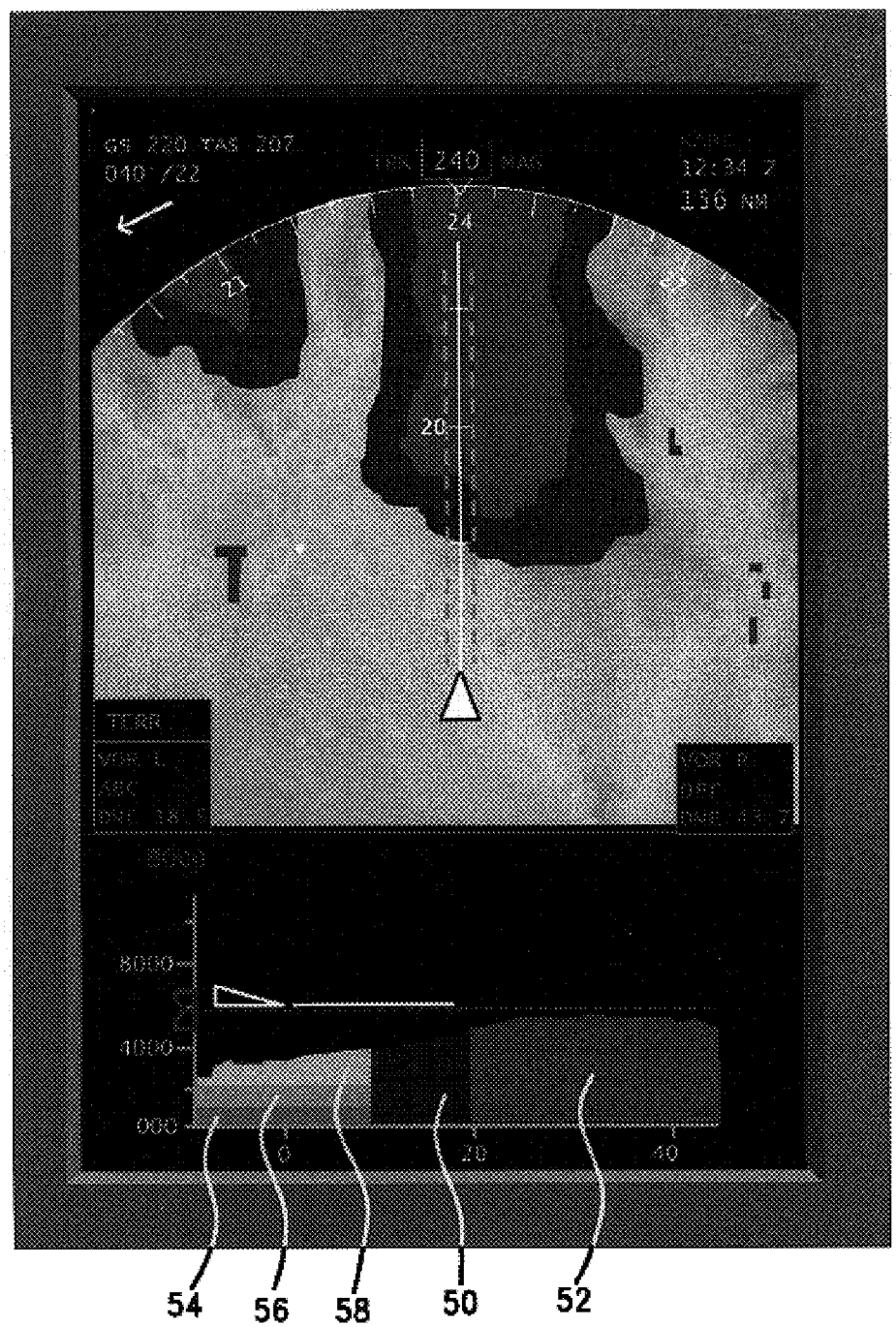
FIG. 4 shows a flight display presenting color filled vertical alerting bands over color filled horizontal absolute altitude bands.

FIG. 4, illustrates the use of vertical alerting bands 50, 52 over color filled horizontal bands 54, 56, 58 representing the absolute altitude of the terrain. The vertical alerting bands 50, 52 become implemented when the Terrain Awareness and Warning System (TAWS) goes into effect.

Figure 5:
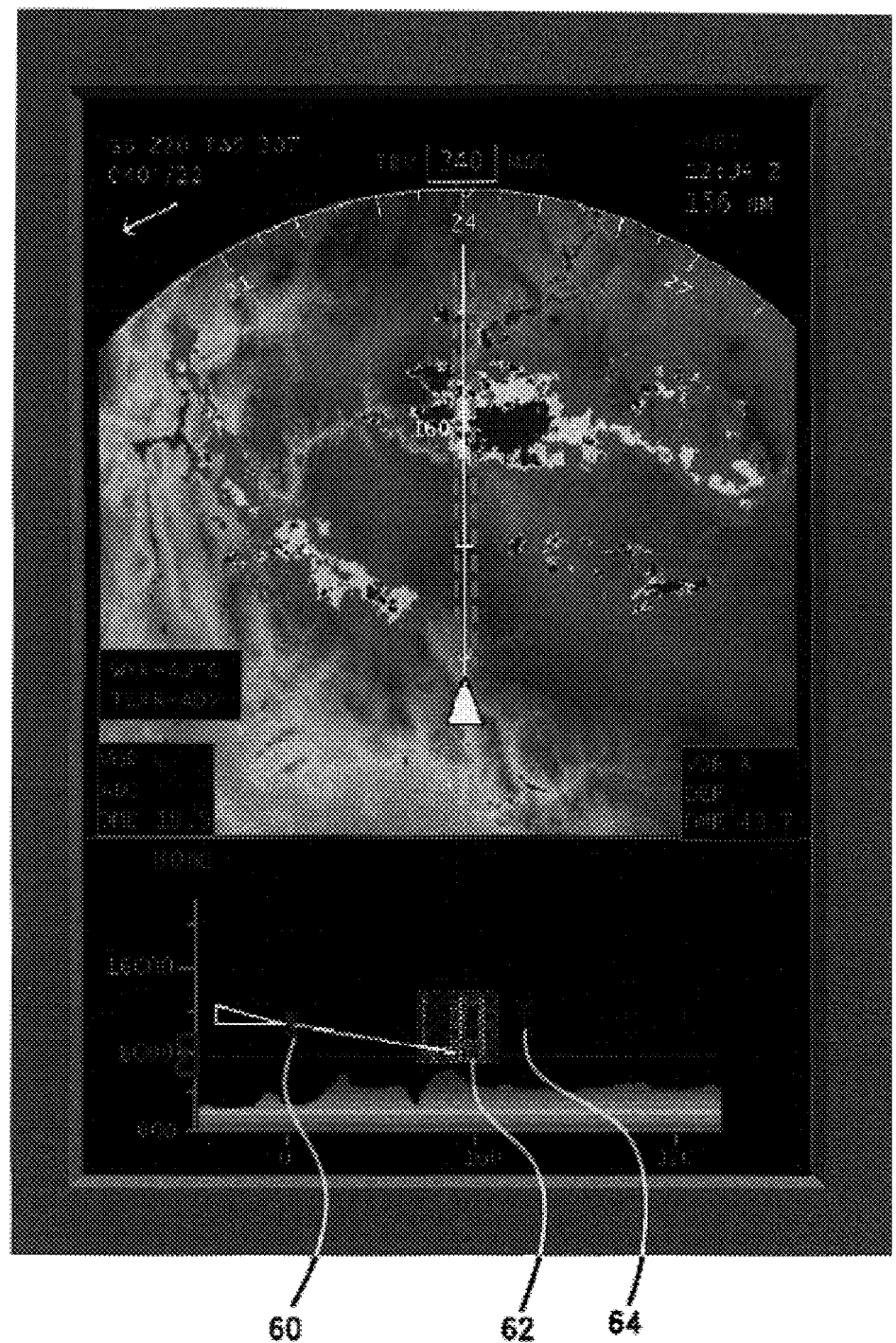
FIG. 5 shows a flight display presenting color filled blocks representing weather hazards over color filled horizontal absolute altitude bands.

Referring now to FIG. 5, color filled blocks 60, 62, 64 are used to represent weather hazards. These weather hazards may be color coded to represent the level of hazard. For example, the green block 60 represents a low level of hazard. The red block 64 represents a high level of hazard. A block, designated generally as 62, is nested with different color filled blocks to represent the level of weather hazard at a particular range and altitude.

Figure 6:
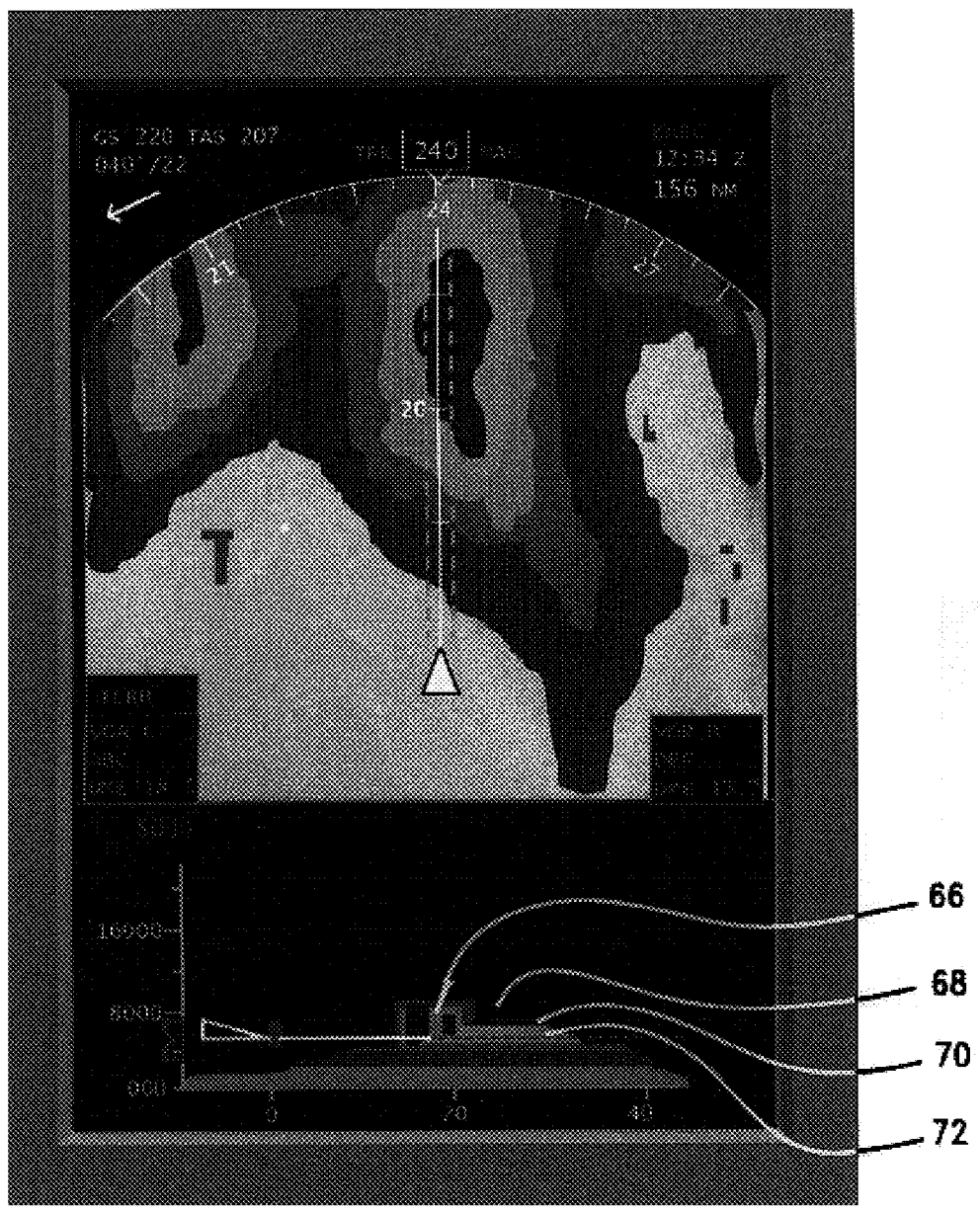
FIG. 6 shows a flight display with color filled blocks representing weather hazards over color filled horizontal absolute altitude bands, the weather hazards shown being present right down to the level of the terrain.

Use of color filled blocks with terrain represents no problem if there is no terrain alerting active. However, if horizontal or vertical band terrain alerting is active then there is a potential for confusion. FIG. 6 depicts a situation where weather hazards 66, 68 are present right down to the level of the terrain, e.g. horizontal bands 70, 72. The use of the same saturated colors (red, yellow, and green) for terrain and weather radar drastically reduces the ability to discriminate terrain from radar, even if a spatially modulated pattern is used for terrain.

Figure 7:
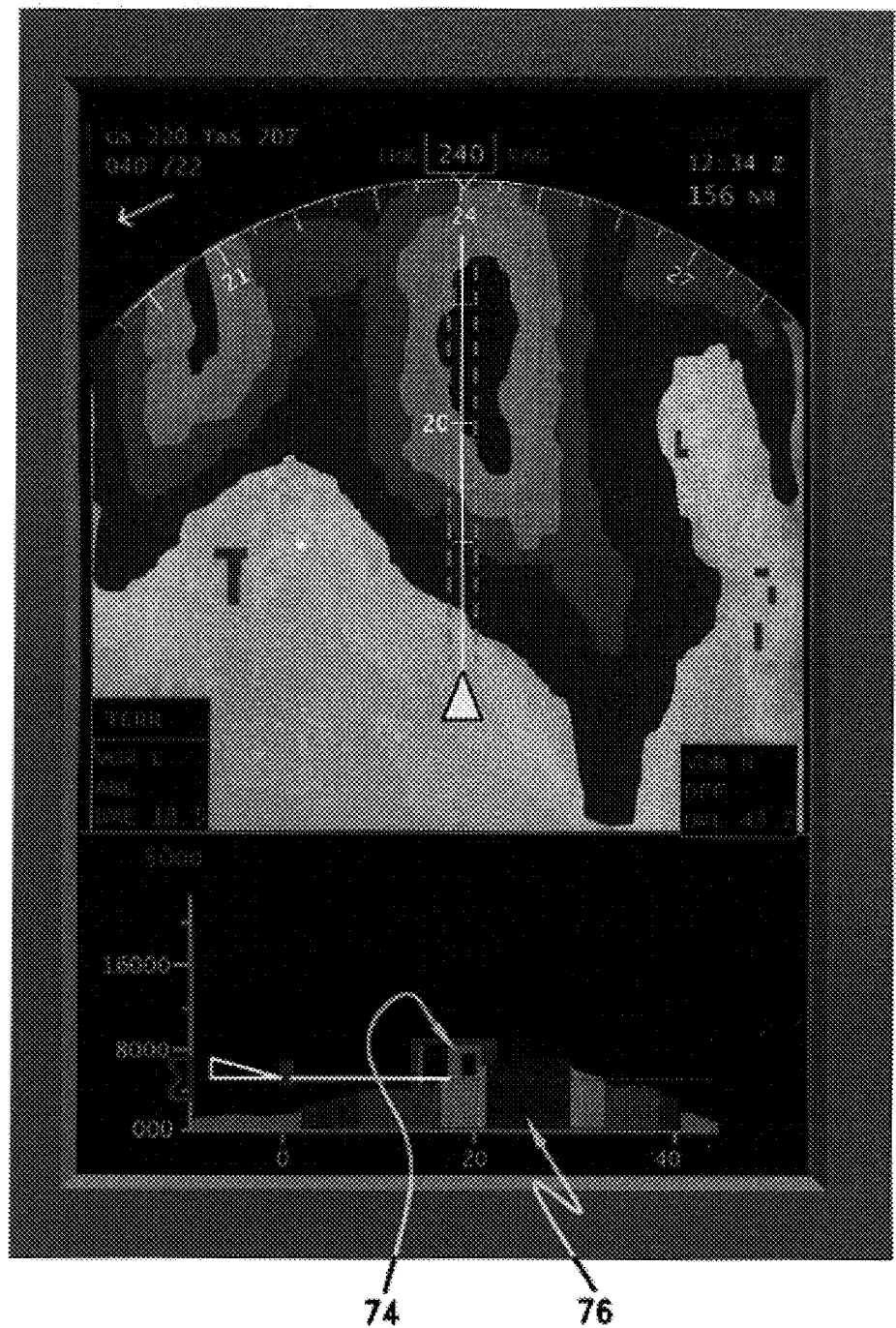
FIG. 7 shows a flight display presenting color filled blocks over color filled vertical alerting bands.

If vertical terrain alerting bands are used, the potential exists for difficulties in distinguishing between the objects of the display, as shown in FIG. 7. In this instance the color filled blocks 74 may be difficult to distinguish from the vertical alerting bands 76. Thus, although implementable as shown, the problem can be mitigated, as described below.

Figure 8:
FIG. 8 shows a flight display presenting color filled blocks separated from color filled horizontal bands by a boundary line.
Figure 9:
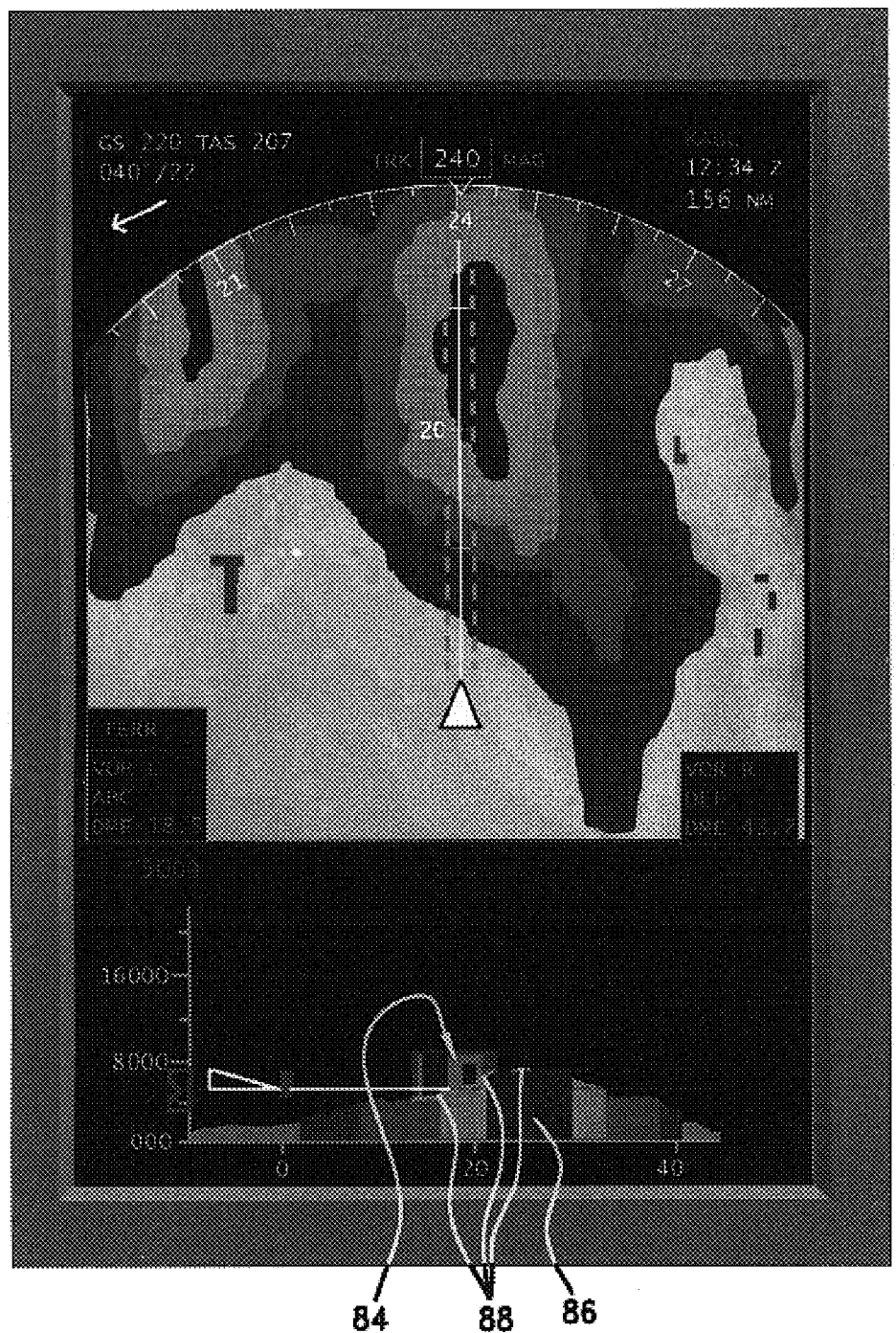
FIG. 9 shows a flight display presenting color filled blocks separated from color filled vertical alerting bands by a boundary line.

Referring now to FIG. 8 color filled blocks 78 and horizontal terrain alerting bands 80 are separated by a boundary line 82 which is preferably a color heretofore not utilized, such as blue. In FIG. 9, color filled blocks 84 and vertical terrain alerting bands 86 are separated by a boundary line 88. (If Terrain Alerting is active, it may also be prudent to remove any vertical weather hazard image.)

Figure 10:
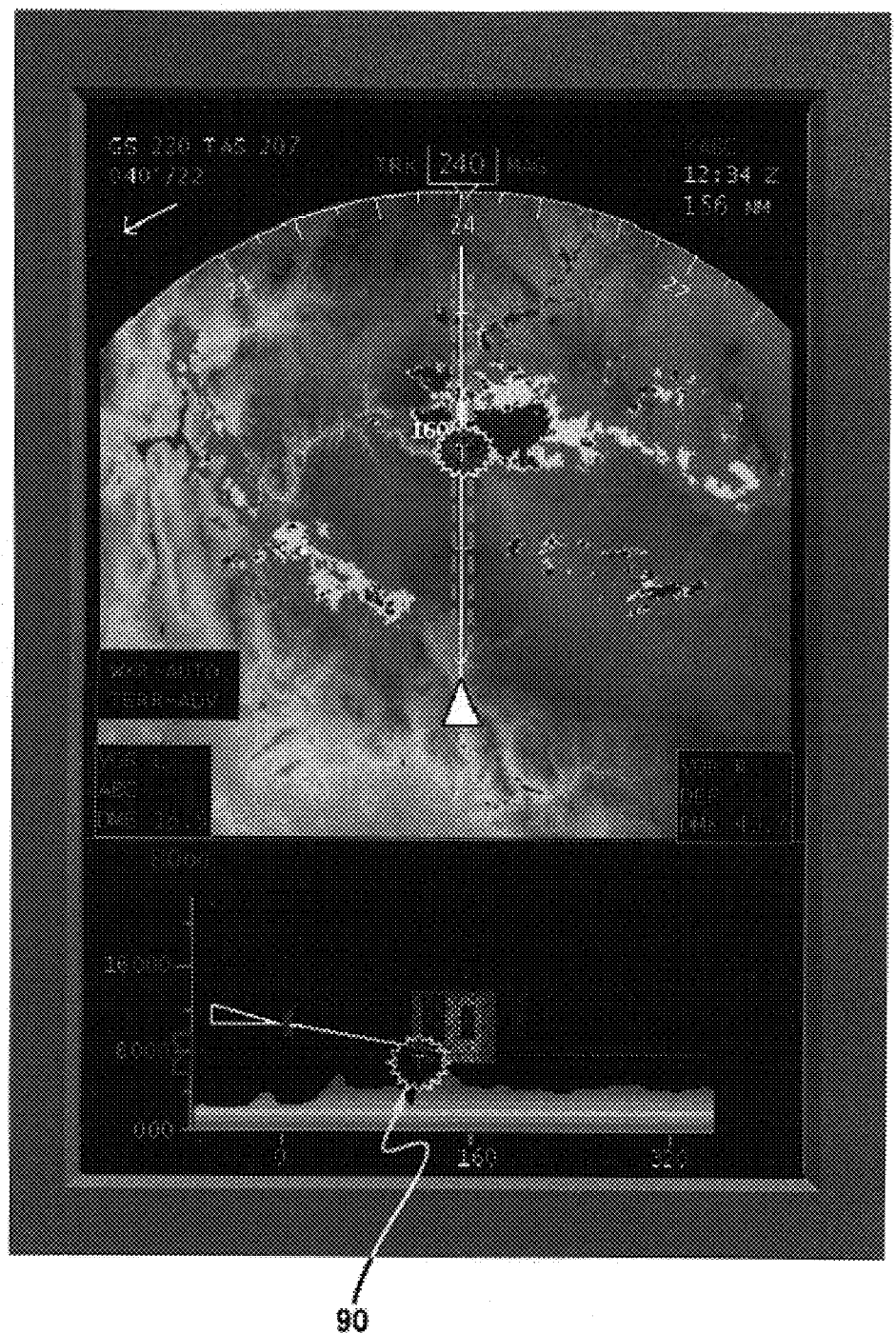
FIG. 10 shows a flight display presenting a terrain alerting prediction icon.

Referring now to FIG. 10, the use of a terrain alerting prediction icon 90 for providing strategic terrain alerting is illustrated. In essence, the icon is telling the flight crew that if the airplane continues on its current track/path, a terrain warning will be generated when the airplane reaches the icon position, i.e. strategic terrain alerting (look ahead). In this Figure, icon 90 is shown used while concurrently displaying weather radar with alerting terrain.

Figure 11:
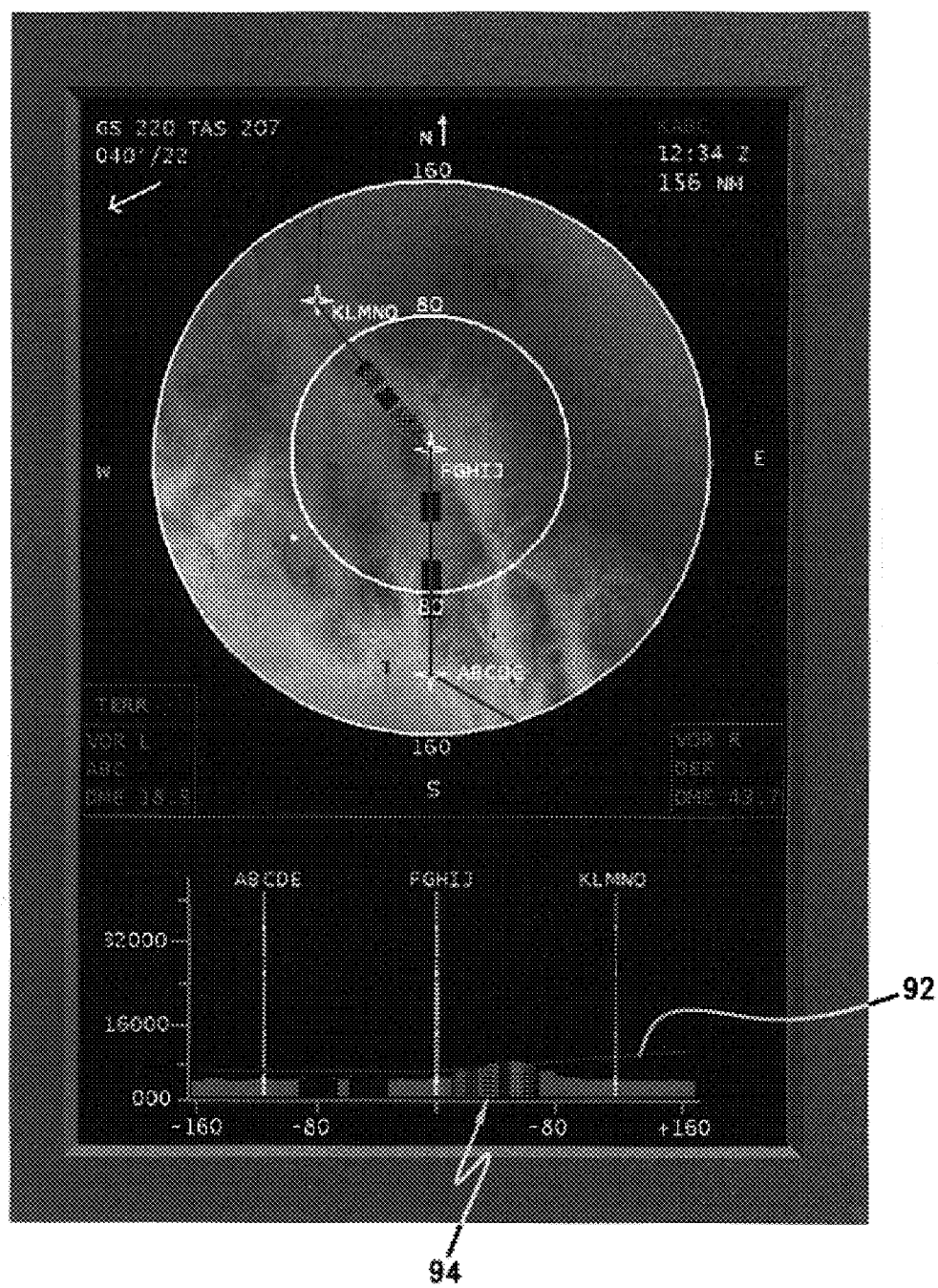
FIG. 11 shows a flight display presenting a predicted flight path and vertical alerting bands.

FIG. 11 illustrates the use of the principles of the present invention to show a predicted vertical flight path. In this embodiment, instead of displaying an airplane icon, a line 92 (for example a magenta line) is used to indicate this predicted flight path along the flight plan route. Waypoints ABCDE, FGHIJ, and KLMNO are displayed. Vertical alerting bands, designated generally as 92, are utilized to ascertain when a conflict is being approached. At each point along the flight plan a terrain conflict calculation is made.

The aircraft Flight Management System (FMS) provides position and heading information data to reference a terrain database. The terrain database may be, for example, an enhanced version of the EGPWS/TAWS database. An appropriate software application can receive the data from the terrain server and render the absolute and/or alerting terrain on the vertical profile display and plan view.

Other embodiments and configurations may be devised without departing from the spirit of the invention and the scope of the appended claims.

The invention claimed is:

1. A flight display for an avionics system of an aircraft for showing an enhanced vertical situation of an aircraft, said flight display comprising a vertical terrain profile display having a format comprising:
   a side-on vertical terrain profile comprising a plurality of color filled vertical alerting bands representing areas of terrain that are within defined alerting limits above and below the airplane altitude, said vertical alerting bands being overlaid on plain terrain, each vertical alerting band being visible only when a portion of the terrain profile exceeds a defined alerting limit, each vertical alerting band extending vertically from an x-axis to that portion of the terrain profile above said defined alerting limit, said x-axis representing the lowest displayed altitude on the vertical terrain profile;
   a symbol being positioned relative to said side-on vertical terrain profile for representing an altitude and position of the aircraft; and,
   displays of range and altitude positioned relative to said symbol and side-on vertical terrain profile in predetermined increments.

2. The flight display of claim 1 wherein said filled vertical alerting bands are overlaid on color filled horizontal bands representing the absolute altitude of said terrain.

3. The flight display of claim 1 wherein said color filled vertical alerting bands have colors utilized by Enhanced Ground Proximity Warning System/Terrain Awareness and Warning Systems (EGPWS/TAWS).

4. The flight display of claim 1 wherein said color filled vertical alerting bands are utilized in combination with color filled blocks, said filled blocks representing weather hazards.

5. The flight display of claim 1 wherein said color filled vertical alerting bands are utilized in combination with nested color filled blocks, said nested color filled blocks representing weather hazards.

6. The flight display of claim 1 wherein said filled vertical alerting bands are utilized in combination with nested color filled blocks, said nested color filled blocks representing weather hazards, said vertical alerting bands and said nested color filled blocks being separated by a boundary line.

7. The flight display of claim 1 wherein said color filled vertical alerting bands are calculated based on the highest terrain within a horizontal swath, along the airplane track or flight plan.

8. The flight display of claim 1 wherein said color filled vertical alerting bands are calculated based on the highest terrain within a horizontal swath, along the airplane track or flight plan, said swath being nominally set to the Required Navigation Performance (RNP).

9. The flight display of claim 1 wherein said airplane altitude is the actual altitude.

10. The flight display of claim 1 wherein said airplane altitude is the predicted altitude.

11. The flight display of claim 1, further comprising a plan view display of the aircraft position.

12. The flight display of claim 1, wherein said color filled vertical alerting bands comprise varying shades of green, yellow and red.

13. The flight display of claim 1, further including a terrain alerting prediction icon for providing strategic terrain alerting.

14. The flight display of claim 1, wherein said symbol comprises a line indicating the airplane's predicted vertical flight path, said vertical terrain profile display further including a display of waypoints.

15. A flight display for an avionics system of an aircraft for showing an enhanced vertical situation of an aircraft, said flight display comprising a vertical terrain profile display having a format comprising:
   a side-on vertical terrain profile comprising a plurality of color filled horizontal absolute altitude bands representing the absolute altitude of said terrain;
   a symbol being positioned relative to said side-on vertical terrain profile for representing an altitude and position of the aircraft; and,
   displays of range and altitude positioned relative to said symbol and side-on vertical terrain profile in predetermined increments,
   said side-on vertical terrain profile further comprising color filled horizontal alerting bands representing areas of terrain that are within defined alerting limits above and below the airplane altitude, said horizontal alerting bands being overlaid on said absolute altitude bands, each horizontal alerting band being visible only when a portion of the terrain profile exceeds a defined alerting limit, each horizontal alerting band extending vertically between said defined alerting limits above and below the airplane altitude, each horizontal alerting band extending horizontally to the contour of the terrain profile.

16. An avionics system, comprising a flight display for showing an enhanced vertical situation of an aircraft, said flight display comprising a vertical terrain profile display having a format comprising:
   a side-on vertical terrain profile comprising a plurality of color filled vertical alerting bands representing areas of terrain that are within defined alerting limits above and below the airplane altitude, said vertical alerting bands being overlaid on plain terrain, each vertical alerting band being visible only when a portion of the terrain profile exceeds a defined alerting limit, each vertical alerting band extending vertically from an x-axis to that portion of the terrain profile above said defined alerting limit, said x-axis representing the lowest displayed altitude on the vertical terrain profile;

a symbol being positioned relative to said side-on vertical terrain profile for representing an altitude and position of the aircraft; and, displays of range and altitude positioned relative to said symbol and side-on vertical terrain profile in predetermined increments.

17. An avionics system, comprising a flight display for showing an enhanced vertical situation of an aircraft, said flight display comprising a vertical terrain profile display having a format comprising:

a side-on vertical terrain profile comprising a plurality of color filled horizontal absolute altitude bands representing the absolute altitude of said terrain;

a symbol being positioned relative to said side-on vertical terrain profile for representing an altitude and position of the aircraft; and, displays of range and altitude positioned relative to said symbol and side-on vertical terrain profile in predetermined increments, said side-on vertical terrain profile further comprising color filled horizontal alerting bands representing areas of terrain that are within defined alerting limits above and below the airplane altitude, said horizontal alerting bands being overlaid on said absolute altitude bands, each horizontal alerting band being visible only when a portion of the terrain profile exceeds a defined alerting limit, each horizontal alerting band extending vertically between said defined alerting limits above and below the airplane altitude, each horizontal alerting band extending horizontally to the contour of the terrain profile.

18. A method of displaying enhanced vertical situation information of an aircraft on a flight display, comprising the steps of:

displaying a side-on vertical terrain profile comprising a plurality of color filled vertical alerting bands representing areas of terrain that are within defined alerting limits above and below the airplane altitude, said vertical alerting bands being overlaid on plain terrain, each vertical alerting band being visible only when a portion of the terrain profile exceeds a defined alerting limit, each vertical alerting band extending vertically from an x-axis to that portion of the terrain profile above said defined alerting limit, said x-axis representing the lowest displayed altitude on the vertical terrain profile;

displaying a symbol being positioned relative to said side-on vertical terrain profile for representing an altitude and position of the aircraft; and, showing displays of range and altitude positioned relative to said symbol and side-on vertical terrain profile in predetermined increments.

* * * * *